Oct. 21, 1952 — W. D. KAYES, JR — 2,614,356
ARTIFICIAL FISH LURE
Filed May 22, 1950

INVENTOR.
William D. Kayes, Jr.
BY
Milo B. Stevens & Co.
Attorneys

Patented Oct. 21, 1952

2,614,356

UNITED STATES PATENT OFFICE 2,614,356

ARTIFICIAL FISH LURE

William D. Kayes, Jr., Chicago, Ill.

Application May 22, 1950, Serial No. 163,435

3 Claims. (Cl. 43—35)

My invention relates to artificial fish lures, and more particularly to those which are a replica of a small fish—such as a minnow—and carry a hook which is normally concealed but moves to a projected position when a fish draws on the lure. Generally, lures of this kind receive the line at the front end, and I have found that this creates a difficulty which many times defeats the purpose of the lure because the fish meets the line and its attaching element as impediments or strange parts before gaining access to the lure itself. It is therefore one object of the present invention to devise a lure of the above character which receives the line at a point well back of the frontal region, so that the same is fully exposed and carries no accessory parts.

A further object is to provide a lure whose line-receiving element is somewhat behind the center portion of the lure and guides the line downwardly to the point where it engages the hook.

A still further object is to construct the lure with a chamber opening on its bottom in which the hook is concealed, and to lead the line into such chamber for engagement with the shank of the hook.

An additional object is to dispose the hook in a manner to swing with its bill in rearward direction when the fish draws on the lure, whereby to lead the hook into engagement with the lower jaw of the fish.

Another object is to engage the line with the hook shank by means of a slidable knot which operates to force the advance of the hook into the lower jaw of the fish as the line is drawn.

An important object is to construct the novel lure along lines of simplicity and compactness.

With the above objects in view, and any others which may suggest themselves from the description to follow, a better understanding of the invention may be had by reference to the accompanying drawing, in which—

Figure 1:
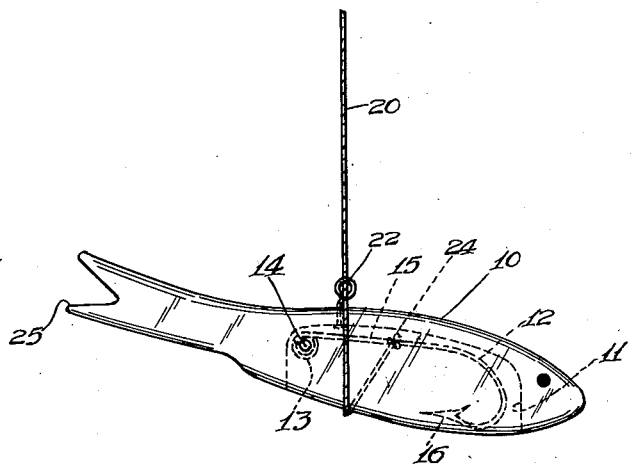
Fig. 1 is a perspective view of the lure in the normal position.

In accordance with the foregoing, specific reference to the drawing indicates the body of the lure at 10, the same being a replica of a small fish, such as a minnow, and preferably made of plastic material. It is also of advantage to put an iridescent finish on the surface of the lure, so that the same may simulate a shiner minnow and therefore have a more attractive property.

Figure 2:
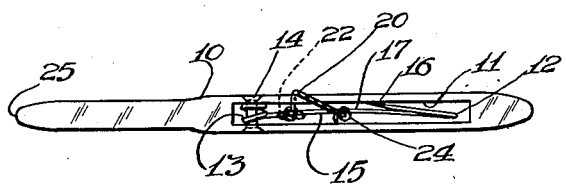
Fig. 2 is a bottom view.

The lure is recessed from the bottom with a long and fairly deep cavity 11 in which the fish hook 12 is normally lodged. As seen in Fig. 1, the base or eye 13 of the hook is pivoted on a crosspin 14 embedded in the body of the lure near the rear end of the cavity 11. Thus, the shank 15 of the hook extends forwardly along the ceiling of the cavity, and the hook is in the forward portion of the cavity with the bill 16 at the bottom and pointing rearwardly. Also, the shank 15 is arched transversely of the cavity 11 as indicated at 17 in order to throw the bill 16 against one side wall of the cavity, as clearly shown in Fig. 2. This imposes a frictional engagement of the hook with the walls of the cavity, serving to support and fully retain the hook within the cavity during normal conditions.

The line 20 may extend from any fishing implement, such as a cane pole or casting rod, and makes connection with the lure by first passing downwardly through a screw eye 22 projecting from the top of the lure at a point somewhat rearwardly of its center. The line then descends along the surface of the lure and is folded upwardly into the cavity to be tied by means of a slidable knot 24 to the shank 15 of the fish hook at a point approximately midway between the hook 12 and the eye 13. This completes the attachment of the line to the lure in a manner to suspend the same with a slight forward dip when the line is lowered into the water or moved forwardly in case it is carried from a boat. The lure is formed with a divided tail 25.

Figure 3:
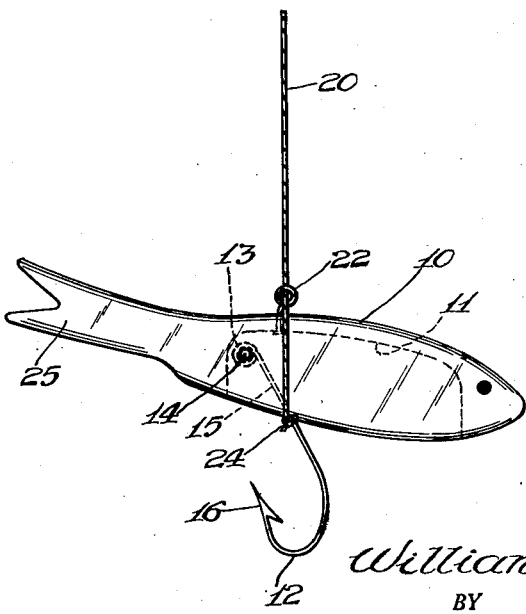
Fig. 3 is a view similar to Fig. 1, showing a change of position resulting from tension on the lure.

Owing to the frictional disposal of the hook within the body of the lure, the latter may be supported in the normal position as long as no pull is exerted on the line or lure. However, in the event of the engagement of the lure by a fish, the effort to swallow the lure will create a sufficient pull or tension on the line to draw downwardly on the hook 12 and cause the same to project in the position shown in Fig. 3. Here the bill of the hook will be brought into engagement with the lower jaw of the fish, this imposing a stop on the lure, so that further efforts by the fish to swallow the same will be futile. Also, the lodging of the fore-part of the lure in the mouth of the fish will prevent the mouth from closing. The action just described will be indicative to the fisherman that a catch has been negotiated, and the pull on the line in consequence will draw the knot 24 upwardly along the shank, forcing the hook rearwardly into a more piercing engagement with the lower jaw of the catch. Further, the upward pull on the lure will pivot the same in a manner to deposit its pointed tail 25 in the lower jaw of the catch to further resist efforts by the latter to close its mouth and swallow the lure.

It will be apparent from the above description that the first attribute of the novel lure is the attachment of its line well back of the frontal lure portion. This portion is the most prominent and attractive part of the lure, and is therefore fully exposed and free of any additional parts or impediments, so that it may be negotiated by a fish as readily as a live minnow. Further, the fish hook is by its own tension firmly positioned within the lure and not subject to removal by the ordinary handling or normal use of the lure. Further, with the fish hook pivoted to project its bill rearwardly, such bill is most favorably positioned for engaging the lower jaw of the catch. Further, the attachment of the line by means of the slidable knot 24 enables the hook to advance on the upward pull of the line with a more thorough engagement of the catch. Further, the pointed rear end of the lure also serves to secure a hold in the jaw of the catch as the frontal part of the lure is drawn upwardly by the pull of the line. Finally, it is evident that the novel lure is composed of very few parts which may be produced with facility by familiar methods, whereby to enable the lure to be marketed at a reasonable cost.

While I have described the invention along specific lines, various minor changes or refinements may be made therein without departing from its principle, and I reserve the right to employ all such changes and refinements as may come within the scope and spirit of the appended claims.

I claim:

1. An artificial fish lure comprising a body having the general form of a fish and designed to be suspended from a line, a guide carried by the body at a point intermediate its ends, the body having a recess made from the bottom, and a hook pivoted in the recess and normally retained therein, the line being applied to the lure by way of said guide and descending alongside of the body and upwardly into the recess to terminate with a portion which is attached to the shank of the hook, a pull on the lure operating to tension the line and swing the hook out of the recess.

2. The structure of claim 1, the guide being an eye attached to the top of said body.

3. The structure of claim 1, the guide being an eye attached to the top of said body, said portion being slidable on the shank toward the pivot when a pull is exerted on the line, whereby to further the advance of the hook.

WILLIAM D. KAYES, Jr.

REFERENCES CITED

The following references are of record in the file of this patent:

UNITED STATES PATENTS

| Number | Name | Date |
| --- | --- | --- |
| 1,588,690 | Babbitt | June 15, 1926 |
| 1,694,697 | Beidatsch | Dec. 11, 1928 |
| 2,205,773 | Fox | June 25, 1940 |